US006465585B2

(12) United States Patent
Luo

(10) Patent No.: US 6,465,585 B2
(45) Date of Patent: Oct. 15, 2002

(54) CHROMIUM-BASED CATALYST COMPOSITION FOR PRODUCING CONJUGATED DIENE POLYMERS

(75) Inventor: Steven Luo, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/788,795

(22) Filed: Feb. 19, 2001

(65) Prior Publication Data

US 2002/0115558 A1 Aug. 22, 2002

(51) Int. Cl.$^7$ .............. C08F 4/42; C08F 4/69; C08F 36/06; B01D 31/12
(52) U.S. Cl. .............. 526/128; 526/126; 526/127; 526/135; 526/136; 526/145; 526/160; 526/169; 526/170; 526/193; 526/335; 502/152; 502/153; 502/154; 502/155; 502/158; 502/162; 502/171
(58) Field of Search .............. 502/152, 153, 502/154, 155, 158, 162, 171; 526/126, 127, 128, 135, 136, 145, 160, 169, 170, 193, 335

(56) References Cited

U.S. PATENT DOCUMENTS

| | | | |
|---|---|---|---|
| 3,498,963 A | 3/1970 | Ichikawa et al. | |
| 3,778,424 A | 12/1973 | Sugiura et al. | |
| 4,148,983 A | 4/1979 | Throckmorton | 526/139 |
| 4,168,357 A | 9/1979 | Throckmorton et al. | 526/139 |
| 4,168,374 A | 9/1979 | Throckmorton et al. | 526/139 |
| 4,182,813 A | 1/1980 | Makino et al. | 526/92 |
| 4,751,275 A | 6/1988 | Witte et al. | 526/139 |
| 5,919,875 A | 7/1999 | Luo et al. | 526/139 |
| 6,117,956 A | 9/2000 | Luo | 526/145 |
| 6,127,301 A * | 10/2000 | Iwanaga et al. | 502/119 |
| 6,201,080 B1 | 3/2001 | Luo et al. | 526/139 |
| 6,320,004 B1 * | 11/2001 | Luo | 502/152 |

OTHER PUBLICATIONS

English Abstract of Japanese Patent 7306939. (1973) No Month.
English Abstract of Japanese Patent 7634178. (1973) No Month.
"Syndiotactic 1,2–Polybutadiene with Co–$CS_2$ Catalyst System. I. Preparation, Properties, and Application of Highly Crystalline Syndiotactic 1,2–Polybutadiene" by Ashitaka et al., *Journal of Polymer Science: Polymer Chemistry Edition*, vol. 21, pp. 1853–1860 (1983) No Month.
"Conjugated Diene Polymerization" by Porri et al., *Comprehensive Polmer Science*, Pergamon Press, Oxford, vol. 4, pp. 53–108, (1989) No Month.

* cited by examiner

Primary Examiner—Elizabeth D. Wood

(57) ABSTRACT

A catalyst composition that is the combination of or the reaction product of ingredients comprising (a) a chromium-containing compound; (b) an organomagnesium compound; and (c) a silyl phosphonate, also, a process for forming conjugated diene polymers by using the catalyst composition.

20 Claims, No Drawings

CHROMIUM-BASED CATALYST COMPOSITION FOR PRODUCING CONJUGATED DIENE POLYMERS

FIELD OF THE INVENTION

The present invention relates to a chromium-based catalyst composition for polymerizing conjugated dienes such as 1,3-butadiene into polymers such as syndiotactic 1,2-polybutadiene.

BACKGROUND OF THE INVENTION

Syndiotactic 1,2-polybutadiene is a crystalline thermoplastic resin that has a stereoregular structure in which the side-chain vinyl groups are located alternately on the opposite sides in relation to the polymeric main chain. Syndiotactic 1,2-polybutadiene is a unique material that exhibits the properties of both plastics and rubber, and therefore it has many uses. For example, films, fibers, and various molded articles can be made from syndiotactic 1,2-polybutadiene. It can also be blended into and co-cured with natural or synthetic rubbers in order to improve the properties thereof. Generally, syndiotactic 1,2-polybutadiene has a melting temperature within the range of about 195° C. to about 215° C., but due to processability considerations, it is generally desirable for syndiotactic 1,2-polybutadiene to have a melting temperature of less than about 195° C.

Various transition metal catalyst systems based on cobalt, titanium, vanadium, chromium, and molybdenum for the preparation of syndiotactic 1,2-polybutadiene have been reported. The majority of these catalyst systems, however, have no practical utility because they have low catalytic activity or poor stereoselectivity, and in some cases they produce low molecular weight polymers or partially crosslinked polymers unsuitable for commercial use.

Two cobalt-based catalyst systems are known for preparing syndiotactic 1,2-polybutadiene. The first comprises a cobalt compound, a phosphine compound, an organoaluminum compound, and water. This catalyst system yields syndiotactic 1,2-polybutadiene having very low crystallinity. Also, this catalyst system develops sufficient catalytic activity only when halogenated hydrocarbon solvents are used as the polymerization medium, and halogenated solvents present toxicity problems.

The second catalyst system comprises a cobalt compound, an organoaluminum compound, and carbon disulfide. Because carbon disulfide has a low flash point, obnoxious smell, high volatility, and toxicity, it is difficult and dangerous to use and requires expensive safety measures to prevent even minimal amounts escaping into the atmosphere. Furthermore, the syndiotactic 1,2-polybutadiene produced with this cobalt catalyst system has a melting temperature of about 200–210° C., which makes it difficult to process. Although the melting temperature of the syndiotactic 1,2-polybutadiene produced with this cobalt catalyst system can be reduced by employing a catalyst modifier, the use of this catalyst modifier has adverse effects on the catalyst activity and polymer yields.

Coordination catalyst systems based on chromium-containing compounds, such as the combination of chromium(III) acetylacetonate and triethylaluminum are known. But, they have very low catalytic activity and poor stereoselectivity for polymerizing conjugated dienes. The product mixture often contains oligomers, low molecular weight liquid polymers or partially crosslinked polymers. Therefore, these catalyst systems have no industrial utility.

For example, the prior art discloses a process for polymerizing 1,3-butadiene into amorphous 1,2-polybutadiene by using a catalyst system comprising a soluble chromium (III) compound, a trialkylaluminum compound, and a dialkyl hydrogen phosphite. The resulting polymer product has an extremely high molecular weight and is partially a gel.

The prior art also discloses a method for preparing elastomers by polymerizing trans-1,3-pentadiene and isoprene in the presence of a catalyst system comprising a soluble chromium compound, a trialkylaluminum compound, and a dihydrocarbyl hydrogen phosphite.

Because syndiotactic 1,2-polybutadiene is a useful product and the catalysts known heretofore in the art have many shortcomings, it would be advantageous to develop a new and significantly improved catalyst composition that has high catalytic activity and stereoselectivity for polymerizing 1,3-butadiene into syndiotactic 1,2-polybutadiene.

SUMMARY OF THE INVENTION

The present invention provides a catalyst composition that is the combination of or the reaction product of ingredients comprising (a) a chromium-containing compound, (b) an organomagnesium compound, and (c) a silyl phosphonate.

The present invention also includes a catalyst composition formed by a process comprising the steps of combining (a) a chromium-containing compound, (b) an organomagnesium compound, and (c) a silyl phosphonate.

The present invention further includes a process for forming conjugated diene polymers comprising the step of polymerizing conjugated diene monomers in the presence of a catalytically effective amount of a catalyst composition formed by combining (a) a chromium-containing compound, (b) an organomagnesium compound, and (c) a silyl phosphonate.

Advantageously, the catalyst composition of the present invention does not contain carbon disulfide. Therefore, the toxicity, objectionable smell, dangers, and expense associated with the use of carbon disulfide are eliminated. In addition, the chromium-containing compounds are generally stable, inexpensive, and readily available. Further, the catalyst composition has high catalytic activity in a wide variety of solvents including the environmentally-preferred nonhalogenated solvents such as aliphatic and cycloaliphatic hydrocarbons. Furthermore, the syndiotactic 1,2-polybutadiene produced with the catalyst composition has a higher melting temperature and higher syndiotacticity than the syndiotactic 1,2-polybutadiene produced with the chromium-based catalyst systems of the prior art.

DETAILED DESCRIPTION OF ILLUSTRATIVE EMBODIMENTS

The catalyst composition is formed by combining (a) a chromium-containing compound, (b) an organomagnesium compound, and (c) a silyl phosphonate. In addition to the three catalyst ingredients (a), (b), and (c), other organometallic compounds or Lewis bases can also be added, if desired.

Various chromium-containing compounds or mixtures thereof can be employed as ingredient (a) of the catalyst composition. Preferably, these chromium-containing compounds are soluble in a hydrocarbon solvent such as aromatic hydrocarbons, aliphatic hydrocarbons, or cycloaliphatic hydrocarbons. Hydrocarbon-insoluble chromium-containing compounds, however, can be suspended in the polymerization medium to form the catalytically active species and are therefore also useful.

The chromium atom in the chromium-containing compounds can be in various oxidation states including, but not limited to, the 0, +2, +3, +4, and +6 oxidation states. Divalent chromium compounds (also called chromous compounds), wherein the chromium atom is in the +2 oxidation state, and trivalent chromium compounds (also called chromic compounds), wherein the chromium atom is in the +3 oxidation state, are preferred. Suitable chromium-containing compounds include, but are not limited to, chromium carboxylates, chromium organophosphates, chromium organophosphonates, chromium organophosphinates, chromium carbamates, chromium dithiocarbamates, chromium xanthates, chromium β-diketonates, chromium alkoxides or aryloxides, chromium halides, chromium pseudohalides, chromium oxyhalides, and organochromium compounds.

Suitable chromium carboxylates include chromium(II) formate, chromium(III) formate, chromium(II) acetate, chromium(III) acetate, chromium(II) acrylate, chromium(III) acrylate, chromium(II) methacrylate, chromium(III) methacrylate, chromium(II) valerate, chromium(III) valerate, chromium(II) gluconate, chromium(III) gluconate, chromium(II) citrate, chromium(III) citrate, chromium(II) fumarate, chromium(III) fumarate, chromium(II) lactate, chromium(III) lactate, chromium(II) maleate, chromium(III) maleate, chromium(II) oxalate, chromium(III) oxalate, chromium(II) 2-ethylhexanoate, chromium(III) 2-ethylhexanoate, chromium(II) neodecanoate, chromium(III) neodecanoate, chromium(II) naphthenate, chromium(III) naphthenate, chromium(II) stearate, chromium(III) stearate, chromium(II) oleate, chromium(III) oleate, chromium(II) benzoate, chromium(III) benzoate, chromium(II) picolinate, and chromium(III) picolinate.

Suitable chromium organophosphates include chromium(II) dibutyl phosphate, chromium(III) dibutyl phosphate, chromium(II) dipentyl phosphate, chromium(III) dipentyl phosphate, chromium(II) dihexyl phosphate, chromium(III) dihexyl phosphate, chromium(II) diheptyl phosphate, chromium(III) diheptyl phosphate, chromium(II) dioctyl phosphate, chromium(III) dioctyl phosphate, chromium(II) bis(1-methylheptyl)phosphate, chromium(III) bis(1-methylheptyl)phosphate, chromium(II) bis(2-ethylhexyl) phosphate, chromium(III) bis(2-ethylhexyl)phosphate, chromium(II) didecyl phosphate, chromium(III) didecyl phosphate, chromium(II) didodecyl phosphate, chromium(III) didodecyl phosphate, chromium(II) dioctadecyl phosphate, chromium(III) dioctadecyl phosphate, chromium(II) dioleyl phosphate, chromium(III) dioleyl phosphate, chromium(II) diphenyl phosphate, chromium(III) diphenyl phosphate, chromium(II) bis(p-nonylphenyl)phosphate, chromium(III) bis(p-nonylphenyl) phosphate, chromium(II) butyl (2-ethylhexyl)phosphate, chromium(III) butyl (2-ethylhexyl)phosphate, chromium(II) (1-methylheptyl) (2-ethylhexyl)phosphate, chromium(III) (1-methylheptyl) (2-ethylhexyl)phosphate, chromium(II) (2-ethylhexyl) (p-nonylphenyl)phosphate, and chromium(III) (2-ethylhexyl) (p-nonylphenyl)phosphate.

Suitable chromium organophosphonates include chromium(II) butyl phosphonate, chromium(III) butyl phosphonate, chromium(II) pentyl phosphonate, chromium(III) pentyl phosphonate, chromium(II) hexyl phosphonate, chromium(III) hexyl phosphonate, chromium(II) heptyl phosphonate, chromium(III) heptyl phosphonate, chromium(II) octyl phosphonate, chromium(III) octyl phosphonate, chromium(II) (1-methylheptyl)phosphonate, chromium(III) (1-methylheptyl)phosphonate, chromium(II) (2-ethylhexyl) phosphonate, chromium(III ) (2-ethylhexyl )phosphonate, chromium(II ) decyl phosphonate, chromium(III) decyl phosphonate, chromium(II) dodecyl phosphonate, chromium(III) dodecyl phosphonate, chromium(II) octadecyl phosphonate, chromium(III) octadecyl phosphonate, chromium(II) oleyl phosphonate, chromium(III) oleyl phosphonate, chromium(II) phenyl phosphonate, chromium(III) phenyl phosphonate, chromium(II) (p-nonylphenyl) phosphonate, chromium(III) (p-nonylphenyl)phosphonate, chromium(II ) butyl butylphosphonate, chromium(III) butyl butylphosphonate, chromium(II) pentyl pentylphosphonate, chromium(II) pentyl pentylphosphonate, chromium(II) hexyl hexylphosphonate, chromium(III) hexyl hexylphosphonate, chromium(II) heptyl heptylphosphonate, chromium(III) heptyl heptylphosphonate, chromium(II) octyl octylphosphonate, chromium(III) octyl octylphosphonate, chromium(II) (1-methylheptyl) (1-methylheptyl)phosphonate, chromium(III) (1-methylheptyl) (1-methylheptyl)phosphonate, chromium(II) (2-ethylhexyl) (2-ethylhexyl)phosphonate, chromium(III) (2-ethylhexyl) (2-ethylhexyl)phosphonate, chromium(II) decyl decylphosphonate, chromium(III) decyl decylphosphonate, chromium(II) dodecyl dodecylphosphonate, chromium(III) dodecyl dodecylphosphonate, chromium(II) octadecyl octadecylphosphonate, chromium(III) octadecyl octadecylphosphonate, chromium(II) oleyl oleylphosphonate, chromium(III) oleyl oleylphosphonate, chromium(II) phenyl phenylphosphonate, chromium(III) phenyl phenylphosphonate, chromium(II) (p-nonylphenyl) (p-nonylphenyl)phosphonate, chromium(III) (p-nonylphenyl) (p-nonylphenyl)phosphonate, chromium(II) butyl (2-ethylhexyl)phosphonate, chromium(III) butyl (2-ethylhexyl)phosphonate, chromium(II) (2-ethylhexyl) butylphosphonate, chromium(III) (2-ethylhexyl) butylphosphonate, chromium(II) (1-methylheptyl) (2-ethylhexyl)phosphonate, chromium(III) (1-methylheptyl) (2-ethylhexyl)phosphonate, chromium(II) (2-ethylhexyl) (1-methylheptyl)phosphonate, chromium(III) (2-ethylhexyl) (1-methylheptyl)phosphonate, chromium(II) (2-ethylhexyl) (p-nonylphenyl)phosphonate, chromium(III) (2-ethylhexyl) (p-nonylphenyl)phosphonate, chromium(II) (p-nonylphenyl) (2-ethylhexyl)phosphonate, and chromium(III) (p-nonylphenyl) (2-ethylhexyl)phosphonate.

Suitable chromium organophosphinates include chromium(II) butylphosphinate, chromium(III) butylphosphinate, chromium(II) pentylphosphinate, chromium(III) pentylphosphinate, chromium(II) hexylphosphinate, chromium(III) hexylphosphinate, chromium(II) heptylphosphinate, chromium(III) heptylphosphinate, chromium(II) octylphosphinate, chromium(III) octylphosphinate, chromium(II) (1-methylheptyl )phosphinate, chromium(III ) (1-methylheptyl)phosphinate, chromium(II) (2-ethylhexyl) phosphinate, chromium(III) (2-ethylhexyl)phosphinate, chromium(II) decylphosphinate, chromium(III) decylphosphinate, chromium(II) dodecylphosphinate, chromium(III) dodecylphosphinate, chromium(II) octadecylphosphinate, chromium(III) octadecylphosphinate, chromium(II) oleylphosphinate, chromium(III) oleylphosphinate, chromium(II) phenylphosphinate, chromium(III) phenylphosphinate, chromium(II) (p-nonylphenyl)phosphinate, chromium(III) (p-nonylphenyl)phosphinate, chromium(II) dibutylphosphinate, chromium(III) dibutylphosphinate, chromium(II) dipentylphosphinate, chromium(III) dipentylphosphinate, chromium(II) dihexylphosphinate, chromium(III) dihexylphosphinate, chromium(II)

diheptylphosphinate, chromium(III) diheptylphosphinate, chromium(II) dioctylphosphinate, chromium(III) dioctylphosphinate, chromium(II) bis(1-methylheptyl) phosphinate, chromium(III) bis(1-methylheptyl) phosphinate, chromium(II) bis(2-ethylhexyl)phosphinate, chromium(III) bis(2-ethylhexyl)phosphinate, chromium(II) dodecylphosphinate, chromium(III) didecylphosphinate, chromium(II) didodecylphosphinate, chromium(III) didodecylphosphinate, chromium(II) dioctadecylphosphinate, chromium(III) dioctadecylphosphinate, chromium(II) dioleylphosphinate, chromium(III) dioleylphosphinate, chromium(II) diphenylphosphinate, chromium(III) diphenyophosphinate, chromium(II) bis(p-nonylphenyl)phosphinate, chromium (III) bis(p-nonylphenyl)phosphinate, chromium(II) butyl(2-ethylhexyl)phosphinate, chromium(III) butyl(2-ethylhexyl) phosphinate, chromium(II) (1-methylheptyl)(2-ethylhexyl) phosphinate, chromium(III) (1-methylheptyl)(2-ethylhexyl) phosphinate, chromium(II) (2-ethylhexyl)(p-nonylphenyl) phosphinate, and chromium(III) (2-ethylhexyl)(p-nonylphenyl)phosphinate.

Suitable chromium carbamates include chromium(II) dimethylcarbamate, chromium(III) dimethylcarbamate, chromium(II) diethylcarbamate, chromium(III) diethylcarbamate, chromium(II) diisopropylcarbamate, chromium(III) diisopropylcarbamate, chromium(II) dibutylcarbamate, chromium(III) dibutylcarbamate, chromium(II) dibenzylcarbamate, and chromium(III) dibenzylcarbamate.

Suitable chromium dithiocarbamates include chromium (II) dimethyldithiocarbamate, chromium(III) dimethyldithiocarbamate, chromium(II) diethyldithiocarbamate, chromium(III) diethyldithiocarbamate, chromium(II) diisopropyldithiocarbamate, chromium(III) diisopropyldithiocarbamate, chromium(II) dibutyldithiocarbamate, chromium(III) dibutyldithiocarbamate, chromium(II) dibenzyldithiocarbamate, and chromium(III) dibenzyldithiocarbamate.

Suitable chromium xanthates include chromium(II) methylxanthate, chromium(III) methylxanthate, chromium (II) ethylxanthate, chromium(III) ethylxanthate, chromium (II) isopropylxanthate, chromium(III) isopropylxanthate, chromium(II) butylxanthate, chromium(III) butylxanthate, chromium(II) benzylxanthate, and chromium(III) benzylxanthate.

Suitable chromium β-diketonates include chromium(II) acetylacetonate, chromium(III) acetylacetonate, chromium (II) trifluoroacetylacetonate, chromium(III) trifluoroacetylacetonate, chromium(II) hexafluoroacetylacetonate, chromium(III) hexafluoroacetylacetonate, chromium(II) benzoylacetonate, chromium(III) benzoylacetonate, chromium(II) 2,2,6,6-tetramethyl-3,5-heptanedionate, chromium(III) 2,2,6,6-tetramethyl-3,5-heptanedionate, chromium(VI) dioxide bis (acetylacetonate), chromium(VI) dioxide bis (trifluoroacetylacetonate), chromium(VI) dioxide bis (hexafluoroacetylacetonate), chromium dioxide(VI) bis (benzoylacetonate), and chromium(VI) dioxide bis(2,2,6,6-tetramethyl-3,5-heptanedionate).

Suitable chromium alkoxides or aryloxides include chromium(II) methoxide, chromium(III) methoxide, chromium(II) ethoxide, chromium(III) ethoxide, chromium (II) isopropoxide, chromium(III) isopropoxide, chromium (II) 2-ethylhexoxide, chromium(III) 2-ethylhexoxide, chromium(II) phenoxide, chromium(III) phenoxide, chromium(II) nonylphenoxide, chromium(III) nonylphenoxide, chromium(II) naphthoxide, and chromium (III) naphthoxide.

Suitable chromium halides include chromium(VI) hexafluoride, chromium(V) pentafluoride, chromium(IV) tetrafluoride, chromium(III) trifluoride, chromium(V) pentachloride, chromium(IV) tetrachloride, chromium trichloride(III), chromium(IV) tetrabromide, chromium(III) tribromide, chromium(III) triiodide, and chromium(II) diiodide.

Suitable chromium pseudo-halides include chromium(II) cyanide, chromium(III) cyanide, chromium(II) cyanate, chromium(III) cyanate, chromium(II) thiocyanate, chromium(III) thiocyanate, chromium(II) azide, and chromium(III) azide.

Suitable chromium oxyhalides include chromium(VI) oxytetrafluoride, chromium(VI) dioxydifluoride, chromium (VI) oxytetrachloride, chromium(V) oxytrichloride, chromium(VI) dioxydichloride, chromium(V) oxytribromide, and chromium(VI) dioxydibromide.

The term "organochromium compound" refers to any chromium compound containing at least one covalent chromium-carbon bond. Suitable organochromium compounds include tris(allyl)chromium(III), tris(methallyl) chromium(III), tris(crotyl)chromium(III), bis (cyclopentadienyl)chromium(II) (also called chromocene), bis(pentamethylcyclopentadienyl)chromium(II) (also called decamethylchromocene), bis(benzene)chromium(0), bis (ethylbenzene)chromium(0), bis(mesitylene)chromium(0), bis(pentadienyl)chromium(II), bis(2,4-dimethylpentadienyl)chromium(II), bis(allyl) tricarbonylchromium(II), (cyclopentadienyl)(pentadienyl) chromium(II), tetra(1-norbornyl)chromium(IV) (trimethylenemethane)tetracarbonylchromium(II), bis (butadiene)dicarbonylchromium(0), (butadiene) tetracarbonylchromium(0), and bis(cyclooctatetraene) chromium(0).

Various organomagnesium compounds or mixtures thereof can be used as ingredient (b) of the catalyst composition. The term "organomagnesium compound" refers to any magnesium compound containing at least one covalent magnesium-carbon bond. Organomagnesium compounds that are soluble in a hydrocarbon solvent are preferred.

A preferred class of organomagnesium compounds is represented by the general formula $MgR^1_2$, where each $R^1$, which may be the same or different, is a mono-valent organic group that is attached to the magnesium atom via a carbon atom. Preferably, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms.

Specific examples of organomagnesium compounds that are represented by the general formula $MgR^1_2$ include dimethylmagnesium, diethylmagnesium, di-n-propylmagnesium, diisopropylmagnesium, di-n-butylmagnesium, di-sec-butylmagnesium, diisobutylmagnesium, di-t-butylmagnesium, di-n-hexylmagnesium, di-n-octylmagnesium, diphenylmagnesium, di-p-tolylmagnesium, and dibenzylmagnesium, and the like, and mixtures thereof. Commercial dibutylmagnesium is particularly useful on the grounds of its availability and its solubility in aliphatic and cycloaliphatic hydrocarbon solvents. Commercial dibutylmagnesium is actually an organometallic oligomer and is comprised of a mixture of n-butyl, sec-butyl, and n-octyl groups bonded to the magnesium atom.

Another class of organomagnesium compounds is represented by the general formula $R^2MgX$, where $R^2$ is a mono-valent organic group that is attached to the magnesium atom via a carbon atom, and X is a hydrogen atom, a halogen atom, a carboxylate group, an alkoxide group, or an aryloxide group. Preferably, $R^2$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Preferably, X is a carboxylate group, an alkoxide group, or an aryloxide group, with each group preferably containing 1 to 20 carbon atoms.

Suitable organomagnesium compounds that are represented by the general formula $R^2MgX$ include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and the like, and mixtures thereof.

Specific examples of organomagnesium compounds that are represented by the general formula $R^2MgX$ include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Useful silyl phosphonate compounds that can be used as ingredient (c) of the catalyst composition include acyclic silyl phosphonates, cyclic silyl phosphonates, and mixtures thereof. Acyclic silyl phosphonates may be represented by the following structure:

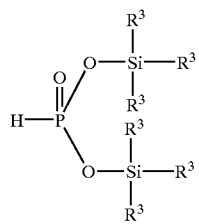

where each $R^3$, which may be the same or different, is a hydrogen atom or a mono-valent organic group. Preferably, each $R^3$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. The acyclic silyl phosphonates may be associated in dimeric, trimeric or oligomeric forms by hydrogen bonding.

Suitable acyclic silyl phosphonates are bis(trimethylsilyl) phosphonate, bis(dimethylsilyl)phosphonate, bis(triethylsilyl)phosphonate, bis(diethylsilyl)phosphonate, bis(tri-n-propylsilyl)phosphonate, bis(di-n-propylsilyl) phosphonate, bis(triisopropylsilyl)phosphonate, bis(diisopropylsilyl)phosphonate, bis(tri-n-butylsilyl) phosphonate, bis(di-n-butylsilyl)phosphonate, bis(triisobutylsilyl)phosphonate, bis(diisobutylsilyl) phosphonate, bis(tri-t-butylsilyl)phosphonate, bis(di-t-butylsilyl)phosphonate, bis(trihexylsilyl)phosphonate, bis(dihexylsilyl)phosphonate, bis(trioctylsilyl)phosphonate, bis(dioctylsilyl)phosphonate, bis(tricyclohexylsilyl) phosphonate, bis(dicyclohexylsilyl)phosphonate, bis(triphenylsilyl)phosphonate, bis(diphenylsilyl)phosphonate, bis(tri-p-tolylsilyl)phosphonate, bis(di-p-tolylsilyl) phosphonate, bis(tribenzylsilyl)phosphonate, bis(dibenzylsilyl)phosphonate, bis(methyldiethylsilyl) phosphonate, bis(methyldi-n-propylsilyl)phosphonate, bis(methyldiisopropylsilyl)phosphonate, bis(methyldi-n-butylsilyl)phosphonate, bis(methyldiisobutylsilyl) phosphonate, bis(methyldi-t-butylsilyl)phosphonate, bis(methyldiphenylsilyl)phosphonate, bis(dimethylethylsilyl) phosphonate, bis(dimethyl-n-propylsilyl)phosphonate, bis(dimethylisopropylsilyl)phosphonate, bis(dimethyl-n-butylsilyl)phosphonate, bis(dimethylisobutylsilyl) phosphonate, bis(dimethyl-t-butylsilyl)phosphonate, bis(dimethylphenylsilyl)phosphonate, bis(t-butyldiphenylsilyl) phosphonate, bis[tris(2-ethylhexyl)silyl]phosphonate, bis[bis(2-ethylhexyl)silyl]phosphonate, bis[tris(nonylphenyl) silyl]phosphonate, bis[tris(2,4,6-trimethylphenyl)silyl] phosphonate, bis[bis(2,4,6-trimethylphenyl)silyl] phosphonate, bis[tris(4-fluorophenyl)silyl]phosphonate, bis [bis(4-fluorophenyl)silyl]phosphonate, bis[tris (pentafluorophenyl)silyl]phosphonate, bis[tris (trifluoromethyl)silyl]phosphonate, bis[tris(2,2,2-trifluoroethyl)silyl]phosphonate, bis[tris(trimethylsilyl) silyl]phosphonate, bis[tris(trimethylsilylmethyl)silyl] phosphonate, bis[tris(dimethylsilyl)silyl]phosphonate, bis [tris(2-butoxyethyl)silyl]phosphonate, bis(trimethoxysilyl) phosphonate, bis(triethoxysilyl)phosphonate, bis(triphenoxysilyl)phosphonate, bis[tris(trimethylsilyloxy) silyl]phosphonate, bis[tris(dimethylsilyloxy)silyl] phosphonate, or mixtures thereof.

Cyclic silyl phosphonates contain a ring structure that is formed by joining two silicon atoms together or by bridging the two silicon atoms with one or more divalent organic groups. These cyclic silyl phosphonates may be represented by the following structure:

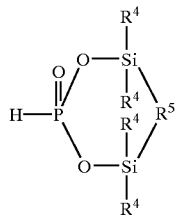

where each $R^4$, which may be the same or different, is a hydrogen atom or a mono-valent organic group, and $R^5$ is a bond between the silicon atoms or a divalent organic group. Bicyclic silyl phosphonates may be formed by joining two $R^4$ groups, and therefore the term cyclic silyl phosphonate will include to multi-cyclic silyl phosphonates. Preferably, each $R^4$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Preferably, $R^5$ is a hydrocarbylene group such as, but not limited to, alkylene, substituted alkylene, cycloalkylene, substituted cycloalkylene, alkenylene, substituted alkenylene, cycloalkenylene, substituted cycloalkenylene, arylene, and substituted arylene groups, with each group preferably containing from 1 carbon atom, or the appropriate minimum number of carbon atoms to form the group, up to about 20 carbon atoms. These hydrocarbylene groups may contain heteroatoms such as, but not limited to, nitrogen, oxygen, silicon, sulfur, and phosphorus atoms. The cyclic silyl phosphonates may be associated in dimeric, trimeric or oligomeric forms by hydrogen bonding.

Suitable cyclic silyl phosphonates are 2-oxo-(2H)-4,5-disila-1,3,2-dioxaphospholane, 2-oxo-(2H)-4,5-disila-4,4,5,5-tetramethyl-1,3,2-dioxaphospholane, 2-oxo-(2H)-4,5-disila-4,4,5,5-tetraethyl-1,3,2-dioxaphospholane, 2-oxo-(2H)-4,5-disila-4,4,5,5-tetraphenyl-1,3,2-dioxaphospholane, 2-oxo-(2H)-4,5-disila-4,4,5,5-tetrabenzyl-1,3,2-dioxaphospholane, 2-oxo-(2H)-4,5-disila-4,5-dimethyl-1,3,2-dioxaphospholane, 2-oxo-(2H)-4,5-disila-4,5-diethyl-1,3,2-dioxaphospholane, 2-oxo-(2H)-4,5-disila-4,5-diphenyl-1,3,2-dioxaphospholane, 2-oxo-(2H)-4,5-disila-4,5-dibenzyl-1,3,2-dioxaphospholane, 2-oxo-(2H)-4,5-disila-4-methyl-1,3,2-dioxaphospholane, 2-oxo-(2H)-4,6-disila-1,3,2-dioxaphospholane, 2-oxo-(2H)-4,6-disila-4,4,6,6-tetramethyl-1,3,2-dioxaphospholane, 2-oxo-(2H)-4,6-disila-4,4,6,6-tetraethyl-1,3,2-dioxaphospholane, 2-oxo-(2H)-4,6-disila-4,4,6,6-tetraphenyl-1,3,2-dioxaphosphorinane, 2-oxo-(2H)-4,6-disila-4,4,6,6-tetrabenzyl-1,3,2-dioxaphosphorinane, 2-oxo-(2H)-4,6-disila-4,6-dimethyl-1,3,2-dioxaphosphorinane, 2-oxo-(2H)-4,6-disila-4,6-diethyl-1,3,2-dioxaphosphorinane, 2-oxo-(2H)-4,6-disila-4,6-diphenyl-1,3,2-dioxaphosphorinane, 2-oxo-(2H)-4,6-disila-4,6-dibenzyl-1,3,2-dioxaphosphorinane, 2-oxo-(2H)-4,6-disila-5,5-dimethyl-1,3,2-dioxaphosphorinane, 2-oxo-(2H)-4,6-disila-5,5-diethyl-1,3,2-dioxaphosphorinane, 2-oxo-(2H)-4,6-disila-5,5-diphenyl-1,3,2-dioxaphosphorinane, 2-oxo-(2H)-4,6-disila-5,5-dibenzyl-1,3,2-dioxaphosphorinane, 2-oxo-(2H)-4,6-disila-5-ethyl-5-methyl-1,3,2-dioxaphosphorinane, 2-oxo-(2H)-4,6-disila-5-methyl-5-propyl-1,3,2-dioxaphosphorinane, 2-oxo-(2H)-4,6-disila-5-butyl-5-ethyl-1,3,2-dioxaphosphorinane, 2-oxo-(2H)-4,6-disila-4-isopropyl-5,5-dimethyl--1,3,2-dioxaphosphorinane, 2-oxo-(2H)-4,6-disila-4-propyl-5-ethyl-1,3,2-dioxaphosphorinane, 2-oxo-(2H)-4,6-disila-4-methyl-1,3,2-dioxaphosphorinane, or mixtures thereof.

The catalyst composition of this invention has very high catalytic activity for polymerizing conjugated dienes, such as 1,3-butadiene, into polymers, such as syndiotactic 1,2-polybutadiene, over a wide range of catalyst concentrations and catalyst ingredient ratios. The polymers having the most desirable properties, however, are obtained within a narrower range of catalyst concentrations and catalyst ingredient ratios. Further, it is believe that the three catalyst ingredients (a), (b), and (c) may interact to form an active catalyst species. Accordingly, the optimum concentration for any one catalyst ingredient is dependent upon the concentrations of the other catalyst ingredients. The molar ratio of the organomagnesium compound to the chromium-containing compound (Mg/Cr) can be varied from about 1:1 to about 50:1, more preferably from about 2:1 to about 30:1, and even more preferably from about 3:1 to about 20:1. The molar ratio of the silyl phosphonate to the chromium-containing compound (P/Cr) can be varied from about 0.5:1 to about 50:1, more preferably from about 1:1 to about 25:1, and even more preferably from about 2:1 to about 10:1.

The catalyst composition is formed by combining or mixing the three catalyst ingredients (a), (b), and (c). Although an active catalyst species is believed to result from this combination, the degree of interaction or reaction between the various ingredients or components is not known with any great degree of certainty. Therefore, the term "catalyst composition" encompasses a simple mixture of the ingredients, a complex of the various ingredients that is caused by physical or chemical forces of attraction, a chemical reaction product of the ingredients, or a combination of the foregoing.

The catalyst composition may be formed in situ by adding the three catalyst ingredients to a solution containing monomer and solvent, or simply bulk monomer, in either a stepwise or simultaneous manner. When adding the catalyst ingredients in a stepwise manner, the sequence in which the catalyst ingredients are added is not critical. Preferably, however, the organomagnesium compound is added first, followed by the chromium-containing compound, and then followed by the silyl phosphonate.

The three catalyst ingredients may be pre-mixed outside the polymerization system at an appropriate temperature, which is generally from about −20° C. to about 80° C., and the resulting catalyst composition is then added to the monomer solution.

The catalyst composition may be pre-formed in the presence of monomer such as 1,3-butadiene. That is, the three catalyst ingredients are pre-mixed in the presence of a small amount of 1,3-butadiene monomer at an appropriate temperature, which is generally from about −20° C. to about 80° C. The amount of 1,3-butadiene monomer that is used for pre-forming the catalyst can range from about 1 to about 500 moles per mole of the chromium-containing compound, more preferably from about 5 to about 250 moles per mole of the chromium-containing compound, and even more preferably from about 10 to about 100 moles per mole of the chromium-containing compound. The resulting catalyst composition is then added to the remainder of the 1,3-butadiene monomer that is to be polymerized.

The catalyst composition maybe formed by using a two-stage procedure. The first stage involves reacting the chromium-containing compound with the organomagnesium compound in the presence of a small amount of 1,3-butadiene monomer at an appropriate temperature, which is generally from about −20° C. to about 80° C. In the second stage, the foregoing reaction mixture and the silyl phosphonate are charged in either a stepwise or simultaneous manner to the remainder of the 1,3-butadiene monomer that is to be polymerized.

An alternative two-stage procedure may also be employed. A chromium-ligand complex is first formed by pre-combining the chromium-containing compound with the silyl phosphonate. Once formed, this chromium-ligand complex is then combined with the organomagnesium compound to form the active catalyst species. The chromium-ligand complex can be formed separately or in the presence of the 1,3-butadiene monomer that is to be polymerized. This complexation reaction can be conducted at any convenient temperature at normal pressure, but for an increased rate of reaction, it is preferable to perform this reaction at room temperature or above. The time required for the formation of the chromium-ligand complex is usually within the range of about 10 minutes to about 2 hours after mixing the chromium-containing compound with the silyl phosphonate. The temperature and time used for the formation of the chromium-ligand complex will depend upon several variables including the particular starting materials and the solvent employed. Once formed, the chromium-ligand complex can be used without isolation from the complexation reaction mixture. If desired, however, the chromium-ligand complex may be isolated from the complexation reaction mixture before use.

When a solution of the catalyst composition or one or more of the catalyst ingredients is prepared outside the polymerization system as set forth in the foregoing methods, an organic solvent or carrier is preferably employed. The organic solvent may serve to dissolve the catalyst composition or ingredients, or the solvent may simply serve as a carrier in which the catalyst composition or ingredients may be suspended. Desirably, an organic solvent that is inert with respect to the catalyst composition is used. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used. For environmental reasons, aliphatic and cycloaliphatic solvents are highly preferred.

The catalyst composition of this invention exhibits very high catalytic activity for the polymerization of 1,3-butadiene into syndiotactic 1,2-polybutadiene. Although one embodiment is directed toward the polymerization of 1,3-butadiene into syndiatactic 1,2-polybutadiene, other conjugated dienes can also be polymerized with the chromium-based catalyst composition. Examples of conjugated dienes that can be polymerized include isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

The production of syndiotactic 1,2-polybutadiene is accomplished by polymerizing 1,3-butadiene in the presence of a catalytically effective amount of the catalyst composition. The total catalyst concentration to be employed in the polymerization mass depends on the interplay of various factors such as the purity of the ingredients, the polymerization temperature, the polymerization rate and conversion desired, and many other factors. Accordingly, a specific total catalyst concentration cannot be definitively set forth except to say that catalytically effective amounts of the respective catalyst ingredients should be used. Generally, the amount of the chromium-containing compound used can be varied from about 0.01 to about 2 mmol per 100 g of 1,3-butadiene monomer, more preferably from about 0.05 to about 1.0 mmol per 100 g of 1,3-butadiene monomer, and even more preferably from about 0.1 to about 0.5 mmol per 100 g of 1,3-butadiene monomer.

The polymerization of 1,3-butadiene is preferably carried out in an organic solvent as the diluent. Accordingly, a solution polymerization system may be employed in which both the 1,3-butadiene monomer to be polymerized and the polymer formed are soluble in the polymerization medium. Alternatively, a precipitation polymerization system may be employed by choosing a solvent in which the polymer formed is insoluble. In both cases, an amount of organic solvent in addition to the amount of organic solvent that may be used in preparing the catalyst composition is usually added to the polymerization system. The additional organic solvent may be the same as or different from the organic solvent used in preparing the catalyst composition. Desirably, an organic solvent that is inert with respect to the catalyst composition employed to catalyze the polymerization is selected. Exemplary hydrocarbon solvents have been set forth above.

The concentration of 1,3-butadiene monomer to be polymerized is not limited to a special range. Preferably, however, the concentration of the 1,3-butadiene monomer present in the polymerization medium at the beginning of the polymerization should be in a range of from about 3% to about 80% by weight, more preferably from about 5% to about 50% by weight, and even more preferably from about 10% to about 30% by weight.

The polymerization of 1,3-butadiene may also be carried out by means of bulk polymerization, which refers to a polymerization environment where no solvents are employed. The bulk polymerization can be conducted either in a condensed liquid phase or in a gas phase.

In performing the polymerization of 1,3-butadiene, a molecular weight regulator may be employed to control the molecular weight of the syndiotactic 1,2-polybutadiene. As a result, the scope of the polymerization system can be expanded in such a manner that it can be used for the production of syndiotactic 1,2-polybutadiene having a wide range of molecular weights. Suitable molecular weight regulators include, but are not limited to, α-olefins such as ethylene, propylene, 1-butene, 1-pentene, 1-hexene, 1-heptene, and 1-octene; accumulated diolefins such as allene and 1,2-butadiene; nonconjugated diolefins such as 1,6-octadiene, 5-methyl-1,4-hexadiene, 1,5-cyclooctadiene, 3,7-dimethyl-1,6-octadiene, 1,4-cyclohexadiene, 4-vinylcyclohexene, 1,4-pentadiene, 1,4-hexadiene, 1,5-hexadiene, 1,6-heptadiene, 1,2-divinylcyclohexane, 5-ethylidene-2-norbornene, 5-methylene-2-norbornene, 5-vinyl-2-norbornene, dicyclopentadiene, and 1,2,4- trivinylcyclohexane; acetylenes such as acetylene, methylacetylene, and vinylacetylene; and mixtures thereof. The amount of the molecular weight regulator used, expressed in parts per hundred parts by weight of the 1,3-butadiene monomer (phm), is from about 0.01 to about 10 phm, preferably from about 0.02 to about 2 phm, and more preferably from about 0.05 to about 1 phm.

The molecular weight of the resulting syndiotactic 1,2-polybutadiene can also be effectively controlled by conducting the polymerization of 1,3-butadiene monomer in the presence of hydrogen gas. In this case, the partial pressure of hydrogen gas is preferably from about 0.01 to about 50 atmospheres.

The polymerization of 1,3-butadiene may be carried out as a batch process, a continuous process, or a semi-continuous process. In the semi-continuous process, 1,3-butadiene monomer is intermittently charged as needed to replace that monomer already polymerized. In any case, the polymerization is preferably conducted under anaerobic conditions by using an inert protective gas such as nitrogen, argon or helium, with moderate to vigorous agitation. The polymerization temperature may vary widely from a low temperature, such as −10° C. or below, to a high temperature such as 100° C. or above, with a preferred temperature range being from about 20° C. to about 90° C. The heat of polymerization may be removed by external cooling, cooling by evaporation of the 1,3-butadiene monomer or the solvent, or a combination of the two methods. Although the polymerization pressure employed may vary widely, a preferred pressure range is from about 1 atmosphere to about 10 atmospheres.

Once a desired conversion is achieved, the polymerization can be stopped by adding a polymerization terminator that inactivates the catalyst. Typically, the terminator employed is a protic compound, which includes, but is not limited to, an alcohol, a carboxylic acid, an inorganic acid, water, or a mixture thereof. An antioxidant such as 2,6-di-tert-butyl-4-methylphenol may be added along with, before or after the addition of the terminator. The amount of the antioxidant employed is usually in the range of 0.2% to 1% by weight of the polymer product. When the polymerization has been stopped, the syndiotactic 1,2-polybutadiene product can be recovered from the polymerization mixture by utilizing conventional procedures of desolventization and drying. For instance, the syndiotactic 1,2-polybutadiene may be isolated from the polymerization mixture by coagulation of the polymerization mixture with an alcohol such as methanol, ethanol, or isopropanol, or by steam distillation of the solvent and the unreacted 1,3-butadiene monomer, followed by filtration. The polymer product is then dried to remove residual amounts of solvent and water.

The syndiotactic 1,2-polybutadiene produced with the catalyst composition of this invention has many uses. It can be blended into and cocured with various natural or synthetic rubbers in order to improve the properties thereof. For example, it can be incorporated into elastomers in order to improve the green strength of those elastomers, particularly in tires. The supporting or reinforcing carcass of tires is particularly prone to distortion during tire building and curing procedures. For this reason, the incorporation of the syndiotactic 1,2-polybutadiene into rubber compositions that are utilized in the supporting carcass of tires has particular utility in preventing or minimizing this distortion. In addition, the incorporation of the syndiotactic 1,2-polybutadiene into tire tread compositions can reduce the heat build-up and improve the tear and wear resistance of tire treads. The syndiotactic 1,2-polybutadiene is also useful in the manufacture of films and packaging materials and in many molding applications.

In order to demonstrate the practice of the present invention, the following examples have been prepared and tested. The examples should not, however, be viewed as limiting the scope of the invention. The claims will serve to define the invention.

EXAMPLES

Example 1

Bis(trimethylsilyl) phosphonate (formula: HP(O)(OSiMe$_3$)$_2$) was synthesized by reacting anhydrous phosphorous acid (H$_3$PO$_3$) with hexamethyldisiloxane (Me$_3$SiOSiMe$_3$) in the presence of anhydrous zinc chloride as the catalyst.

Anhydrous phosphorous acid (33.1 g, 0.404 mol), hexamethyldisiloxane (98.4 g, 0.606 mol), anhydrous zinc chloride (2.0 g, 0.015 mol), and benzene (240 mL) were mixed in a round-bottom reaction flask that was connected to a Dean-Stark trap and a reflux condenser. The mixture was heated to reflux for 24 hours, with continuous removal of water via the Dean-Stark trap. The reaction flask was then connected to a distillation head and a receiving flask. The benzene solvent and the unreacted hexamethyldisiloxane were removed by distillation at atmospheric pressure. The remaining crude product was distilled under vacuum, yielding bis(trimethylsilyl) phosphonate as a colorless liquid (51.7 g, 0.228 mol, 57% yield). The identity of the product was established by nuclear magnetic resonance (NMR) spectroscopy. $^1$H NMR data (CDCl$_3$, 25° C., referenced to tetramethylsilane): δ6.85 (doublet, $^1J_{HP}$=699 Hz, 1 H, H-P), 0.31 (singlet, 18 H, CH$_3$). $^{13}$P NMR data (CDCl$_3$, 25° C., referenced to external 85% H$_3$PO$_4$): δ−14.0 (doublet, $^1J_{HP}$=698 Hz).

Example 2

Bis(triethylsilyl)phosphonate (formula: HP(O)(OSiEt$_3$)$_2$) was synthesized by reacting anhydrous phosphorous acid (H$_3$PO$_3$) with hexaethyldisiloxane (Et$_3$SiOSiEt$_3$) in the presence of anhydrous zinc chloride as the catalyst.

Anhydrous phosphorous acid (22.1 g, 0.269 mol), hexaethyldisiloxane (99.5 g, 0.404 mol), anhydrous zinc chloride (1.33 g, 0.010 mol), and toluene (230 mL) were mixed in a round-bottom reaction flask that was connected to a Dean-Stark trap and a reflux condenser. The mixture was heated to reflux for 29 hours, with continuous removal of water via the Dean-Stark trap. The reaction flask was then connected to a distillation head and a receiving flask. The toluene solvent and the unreacted hexaethyldisiloxane were removed by distillation at atmospheric pressure. The remaining crude product was distilled under vacuum, yielding bis(triethylsilyl)phosphonate as a colorless liquid (67.9 g, 0.219 mol, 81% yield). The identity of the product was established by nuclear magnetic resonance (NMR) spectroscopy. $^1$H NMR data (CDCl$_3$, 25° C., referenced to tetramethylsilane): δ6.92 (doublet, $^1J_{HP}$=695 Hz, 1 H, H-P), 1.01 (triplet, $^3J_{HH}$=7.4, 18 H, CH$_3$), 0.76 (quartet, $^3J_{HH}$=7.4, 12 H, CH$_2$). $^{13}$P NMR data (CDCl$_3$, 25° C., referenced to external 85% H$_3$PO$_4$): δ−14.5 (doublet, $^1J_{HP}$=695 Hz).

Example 3

An oven-dried 1-liter glass bottle was capped with a self-sealing rubber liner and a perforated metal cap. After the bottle was thoroughly purged with a stream of dry nitrogen gas, the bottle was charged with 236 g of a 1,3-butadiene/ hexanes blend containing 21.2% by weight of 1,3-butadiene. The following catalyst ingredients were then added to the bottle in the following order: (1) 0.90 mmol of dibutylmagnesium, (2) 0.15 mmol of chromium(III) 2-ethylhexanoate, and (3) 0.60 mmol of bis(trimethylsilyl) phosphonate. The bottle was tumbled for 15 hours in a water bath maintained at 50° C. The polymerization was terminated by addition of 10 mL of isopropanol containing 1.0 g of 2,6-di-tert-butyl-4-methylphenol. The polymerization mixture was coagulated with 3 liters of isopropanol. The resulting syndiotactic 1,2-polybutadiene was isolated by filtration and dried to a constant weight under vacuum at 60° C. The yield of the polymer was 40.6 g (81% yield). As measured by differential scanning calorimetry (DSC), the polymer had a melting temperature of 150° C. The $^1$H and $^{13}$C nuclear magnetic resonance (NMR) analysis of the polymer indicated a 1,2-linkage content of 78% and a syndiotacticity of 79%.

Example 4

In Example 4, the procedure described in Example 3 was repeated except that bis(triethylsilyl)phosphonate was substituted for bis(trimethylsilyl)phosphonate. The yield of the polymer was 43.3 g (87% yield). As measured by differential scanning calorimetry (DSC), the polymer had a melting temperature of 146° C. The $^1$H and $^{13}$C nuclear magnetic resonance (NMR) analysis of the polymer indicated a 1,2-linkage content of 82% and a syndiotacticity of 71%.

Comparative Example 5

An oven-dried 1-liter glass bottle was capped with a self-sealing rubber liner and a perforated metal cap. After the bottle was thoroughly purged with a stream of dry nitrogen gas, the bottle was charged with 255 g of hexanes and 236 g of a 1,3-butadiene/hexanes blend containing 21.2% by weight of 1,3-butadiene. The following catalyst ingredients were then added to the bottle in the following order: (1) 0.75 mmol of triethylaluminum, (2) 0.050 mmol of chromium (III) 2-ethylhexanoate, and (3) 0.33 mmol of dineopentyl hydrogen phosphite. The bottle was tumbled for 4 hours in a water bath maintained at 50° C. The polymerization was terminated by addition of 10 mL of isopropanol containing 1.0 g of 2,6-di-tert-butyl-4-methylphenol. The polymerization mixture was coagulated with 3 liters of isopropanol. The resulting syndiotactic 1,2-polybutadiene was isolated by filtration and dried to a constant weight under vacuum at 60° C. The yield of the polymer was 48.0 g (96% yield). As measured by differential scanning calorimetry (DSC), the polymer had a melting temperature of 97° C. The $^1$H and $^{13}$C nuclear magnetic resonance (NMR) analysis of the polymer indicated a 1,2-linkage content of 81% and a syndiotacticity of 66%.

Comparison of the analytical data of the syndiotactic 1,2-polybutadiene products obtained in Examples 3 and 4 with the analytical data of the syndiotactic 1,2-polybutadiene product obtained in Comparative Examples 5 indicates that the chromium-based catalyst composition of the present invention produces syndiotactic 1,2-polybutadiene of higher quality as shown by the significantly higher melting temperature and higher syndiotacticity than are obtained with the chromium-containing catalyst systems of the prior art.

Various modifications and alterations that do not depart from the scope and spirit of this invention will become apparent to those skilled in the art. This invention is not to be duly limited to the illustrative embodiments set forth herein.

What is claimed is:
1. A catalyst composition that is the combination of or the reaction product of ingredients comprising:
 (a) a chromium-containing compound;
 (b) an organomagnesium compound; and
 (c) a silyl phosphonate.
2. The catalyst composition of claim 1, where said chromium-containing compound is a chromium carboxylate, chromium organophosphate, chromium organophosphonate, chromium organophosphinate, chromium carbamate, chromium dithiocarbamate, chromium xanthate, chromium β-diketonate, chromium alkoxide or aryloxide, chromium halide, chromium pseudo-halide, chromium oxyhalide, or organochromium compound.
3. The catalyst composition of claim 1, where said organomagnesium compound is selected from compounds defined by the formula $MgR^1_2$, where each $R^1$, which may be the same or different, is a mono-valent organic group that is attached to the magnesium atom via a carbon atom.
4. The catalyst composition of claim 3, where each $R^1$ is an alkyl, cycloalkyl, substituted cycloalkyl, alkenyl, cycloalkenyl, substituted cycloalkenyl, aryl, substituted aryl, aralkyl, alkaryl, allyl, or alkynyl group.
5. The catalyst composition of claim 4, where said organomagnesium compound is dimethylmagnesium, diethylmagnesium, di-n-propylmagnesium, diisopropylmagnesium, di-n-butylmagnesium, di-sec-butylmagnesium, diisobutylmagnesium, di-t-butylmagnesium, di-n-hexylmagnesium, di-n-octylmagnesium, diphenylmagnesium, di-p-tolylmagnesium, or dibenzylmagnesium.
6. The catalyst composition of claim 1, where said organomagnesium compound is selected from compounds defined by the formula $R^2MgX$, where $R^2$ is a mono-valent organic group that is attached to the magnesium atom via a carbon atom, and X is a hydrogen atom, a halogen atom, a carboxylate group, an alkoxide group, or an aryloxide group.
7. The catalyst composition of claim 6, where $R^2$ is an alkyl, cycloalcyl, substituted cycloalkyl, alkenyl, cycloalkenyl, substituted cycloalkenyl, aryl, substituted aryl, aralkyl, alkaryl, allyl, or alkynyl group.
8. The catalyst composition of claim 6, where said organomagnesium compound is hydrocarbylmagnesium hydride, hydrocarbylmagnesium halide, hydrocarbylmagnesium carboxylate, hydrocarbylmagnesium alkoxide, or hydrocarbylmagnesium aryloxide compound.
9. The catalyst composition of claim 1, where said silyl phosphonate is an acyclic silyl phosphonate defined by the following structure:

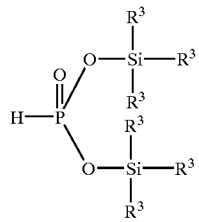

where each $R^3$, which may be the same or different, is a hydrogen atom or a mono-valent organic group.
10. The catalyst composition of claim 9, where $R^3$ is an alkyl, cycloalkyl, substituted cycloalkyl, alkenyl, cycloalkenyl, substituted cycloalkenyl, aryl, substituted aryl, aralkyl, alkaryl, allyl, or alkynyl group.
11. The catalyst composition of claim 10, where said acyclic silyl phosphonate is bis(trimethylsilyl)phosphonate, bis(triethylsilyl)phosphonate, bis(tri-n-propylsilyl) phosphonate, bis(triisopropylsilyl)phosphonate, bis(tri-n-butylsilyl)phosphonate, bis(tricyclohexylsilyl)phosphonate, bis(triphenylsilyl)phosphonate, bis[tris(2-ethylhexyl)silyl] phosphonate, or bis[tris(2,4,6-trimethylphenyl)silyl] phosphonate.

12. The catalyst composition of claim 1, where said silyl phosphonate is a cyclic silyl phosphonate that is defined by the following structure:

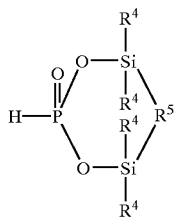

where each $R^4$, which may be the same or different, is a hydrogen atom or a mono-valent organic group, and $R^5$ is a bond between silicon atoms or a divalent organic group.

13. The catalyst composition of claim 12, where $R^4$ is an alkyl, cycloalkyl, substituted cycloalkyl, alkenyl, cycloalkenyl, substituted cycloalkenyl, aryl, substituted aryl, aralkyl, alkaryl, allyl, or alkynyl group, and where $R^5$ is an alkylene, substituted alkylene, cycloalkylene, substituted cycloalkylene, alkenylene, substituted alkenylene, cycloalkenylene, substituted cycloalkenylene, arylene, or substituted arylene group.

14. The catalyst compoistion of claim 13, where said cyclic silyl phosphonate is 2-oxo-(2H)-4,5-disila-1,3,2-dioxaphospholane, 2-oxo-(2H)-4,5-disila-4,4,5,5-tetramethyl-1,3,2-dioxaphospholane, 2-oxo-(2H)-4,5-disila-4,4,5,5-tetraphenyl--1,3,2-dioxaphospholane, 2-oxo-(2H)-4,6-disila-1,3,2-dioxaphosphorinane, 2-oxo-(2H)-4,6-disila-4,4,6,6-tetramethyl-1,3,2-dioxaphosphorinane, 2-oxo-(2H)-4,6-disila-4,4,6,6-tetraethyl-1,3,2-dioxaphosphorinane, 2-oxo-(2H)-4,6-disila-4,4,6,6-tetraphenyl-1,3,2-dioxaphosphorinane, 2-oxo-(2H)-4,6-disila-4,4,6,6-tetrabenzyl-1,3,2-dioxaphosphorinane, 2-oxo-(2H)-4,6-disila-4,6-dimethyl-1,3,2-dioxaphosphorinane, or 2-oxo-(2H)-4,6-disila-4,6-diethyl-1,3,2-dioxaphosphorinane.

15. The catalyst compoistion of claim 1, where the molar ratio of said organomagnesium compound to said chromium-containing compound is from about 1:1 to about 50:1, and the molar ratio of said silyl phosphonate to said chromium-containing compound is from about 0.5:1 to about 50:1.

16. The catalyst composition of claim 15, where the molar ratio of said organomagnesium compound to said chromium-containing compound is from about 2:1 to about 30:1, and the molar ratio of the silyl phosphonate to said chromium-containing compound is from about 1:1 to about 25:1.

17. A catalyst composition formed by a process comprising the steps of combining:
   (a) a chromium-containing compound;
   (b) an organomagnesium compound; and
   (c) a silyl phosphonate.

18. A process for forming conjugated diene polymers comprising the step of:
   polymerizing conjugated diene monomers in the presence of a catalytically effective amount of a catalyst composition formed by combining:
   (a) a chromium-containing compound;
   (b) an organomagnesium compound; and
   (c) a silyl phosphonate.

19. The process of claim 18, where said conjugated diene monomers are 1,3-butadiene.

20. The process of claim 18, where said catalytically effective amount includes from about 0.01 to about 2 mmol per 100 g of monomer.

* * * * *